(12) United States Patent
Tang et al.

(10) Patent No.: US 11,767,019 B1
(45) Date of Patent: Sep. 26, 2023

(54) VEHICLE-MOUNTED EQUIPMENT FOR RAPID DETECTION OF DANGER AND HIDDEN DANGER OF A DIKE AND OPERATION METHOD THEREOF

(71) Applicant: NANJING HYDRAULIC RESEARCH INSTITUTE UNDER THE MINISTRY OF WATER RESOURCES, The Ministry of Transport and the National Energy Administration, Nanjing (CN)

(72) Inventors: Lei Tang, Nanjing (CN); Jun Lu, Nanjing (CN); Shenghang Zhang, Nanjing (CN); Pan Ming, Nanjing (CN); Maogan Dong, Nanjing (CN); Jiang Yu, Nanjing (CN); Xiangqian Fan, Nanjing (CN); Qibing Zhan, Nanjing (CN)

(73) Assignee: NANJING HYDRAULIC RESEARCH INSTITUTE UNDER THE MINISTRY OF WATER RESOURCES, THE MINISTRY OF TRANSPORT AND THE NATIONAL ENERGY ADMINISTRATION, Nanjing (CN)

(*) Notice: Subject to any disclaimer, the term of this patent is extended or adjusted under 35 U.S.C. 154(b) by 0 days.

(21) Appl. No.: 18/139,621

(22) Filed: Apr. 26, 2023

(30) Foreign Application Priority Data

Apr. 27, 2022 (CN) .......................... 202210454075.1

(51) Int. Cl.
*B60W 40/06* (2012.01)
*G01V 3/15* (2006.01)
(Continued)

(52) U.S. Cl.
CPC ......... *B60W 40/06* (2013.01); *B60W 2420/42* (2013.01); *B60W 2420/52* (2013.01);
(Continued)

(58) Field of Classification Search
None
See application file for complete search history.

(56) References Cited

U.S. PATENT DOCUMENTS 5,192,953 A    3/1993   Tomita
8,688,423 B2 *   4/2014   Jessop ..................... G06T 17/05
                                                                            73/152.29
(Continued)

FOREIGN PATENT DOCUMENTS

AU       2018101830 A4    1/2019
CN         101295027 A    10/2008
(Continued)

*Primary Examiner* — Todd Melton
(74) *Attorney, Agent, or Firm* — Schmeiser, Olsen & Watts, LLP (57) ABSTRACT

A vehicle-mounted equipment and operation method for rapid detection of danger and hidden danger of a dike is provided, wherein the equipment includes: an operation vehicle; an operation shelter, located behind the cockpit of the operation vehicle and arranged on the chassis of the operation vehicle; a detection system, including a ground penetrating radar detection module, a transient electromagnetic detection module and a seismic wave detection module to perform physical detection of the dike.

10 Claims, 2 Drawing Sheets

(51) Int. Cl.
*G01V 3/12* (2006.01)
*G01S 13/88* (2006.01)

(52) U.S. Cl.
CPC .... *B60W 2554/4041* (2020.02); *G01S 13/885* (2013.01); *G01V 3/12* (2013.01); *G01V 3/15* (2013.01)

(56) References Cited

U.S. PATENT DOCUMENTS

| | | | |
|---|---|---|---|
| 9,945,832 B2 * | 4/2018 | Trobat | G01N 33/24 |
| 10,145,837 B2 * | 12/2018 | Troxler | E01C 19/235 |
| 10,866,227 B2 * | 12/2020 | Rudahl | G01N 33/24 |

FOREIGN PATENT DOCUMENTS

| | | | |
|---|---|---|---|
| CN | 103898931 A | 7/2014 |
| CN | 112327372 A | 2/2021 |
| CN | 113791412 A | 12/2021 |
| CN | 113917547 A | 1/2022 |
| CN | 114236621 A | 3/2022 |
| JP | 2015-90345 A | 5/2015 |

* cited by examiner

VEHICLE-MOUNTED EQUIPMENT FOR RAPID DETECTION OF DANGER AND HIDDEN DANGER OF A DIKE AND OPERATION METHOD THEREOF

CROSS-REFERENCE TO RELATED APPLICATIONS

This application claims priority to Chinese App. No. 202210454075.1, having a filing date of Apr. 27, 2022, the entire contents all of which are hereby incorporated by reference.

FIELD OF TECHNOLOGY

The following pertains to the field of detection of engineering hidden danger and particularly relates to vehicle-mounted equipment for rapid detection of danger and hidden danger of a dike and an operation method thereof.

BACKGROUND

Dikes are key barriers to ensure flood safety. Detecting dikes by the physical detection method is an important way to effectively identify hidden danger, timely deal with danger and ensure dike safety, but the existing physical detection method still has obvious weak points, resulting in incomplete identification of hidden danger of dikes and untimely result diagnosis, as mainly manifested in the following few aspects: (i) When the existing physical detection method is used in dike detection, the equipment is used mostly through manual towing, with a low degree of automation, and the dikes are complex in terrain and ordinary vehicles cannot move along normally, resulting in a low detection efficiency; (ii) The dikes have many interference sources and high water content in a flood season, so a single physical detection method shows a limitation to dike exploration and multiple solutions to result explanation, unable to achieve full coverage and diagnosis of dike's hidden danger and resulting in incomplete identification of hidden danger; (iii) The inspection density and intensity are high in a flood season, so the inspection shall be fast and accurate. In a rain, the physical detection instruments show a poor protection and effect and the physical detection data needs to be processed and analyzed after completion of the detection, unable to realize on-site study and judgment, showing poor timeliness in result diagnosis.

In highway and other municipal engineering inspection fields, it has been reported that a ground penetrating radar and other detection devices or a laser radar, camera and other apparent recording devices are refit and mounted on a vehicle for work. This to some extent improves the efficiency of engineering inspection, but due to the abovementioned complexity of dike engineering and the particularity of working scenarios, such inspection devices are unable to be used in dike exploration directly or after simple modifications, innovative and key breakthroughs are required in equipment assembly architecture, multi-method joint diagnostic operation, and quick positioning of areas with hidden danger.

SUMMARY

An aspect relates to providing vehicle-mounted equipment for rapid detection of danger and hidden danger of a dike and an operation method thereof.

In order to achieve the foregoing aspect, embodiments of the present invention adopt the following technical solution:

Vehicle-mounted equipment for rapid detection of danger and hidden danger of a dike, comprising:

an operation vehicle;

an operation shelter, located behind the cockpit of the operation vehicle and arranged on the chassis of the operation vehicle;

a detection system, comprising a ground penetrating radar detection module, a transient electromagnetic detection module and a seismic wave detection module to perform physical detection of the dike, respectively;

a scanning system, comprising a laser radar module and a lifting module, wherein the lifting module is mounted at the tail end of the top of the operation shelter, the laser radar module is fixed on the lifting module, moves with the operation vehicle and scans the dike surface;

a video recording system, for video-recording the environment around the operation vehicle;

a positioning system, comprising a positioning module mounted on the top of the operation shelter, wherein the positioning module transmits positioning information synchronously to the detection system, the scanning system, the video recording system and a data processing system;

the data processing system, comprising a server mounted inside the operation shelter and a display device connected to the server, wherein the server receives and processes data transmitted by the detection system, the scanning system, the video recording system and the positioning system; the server contains a typical atlas library of ground penetrating radar and transient electromagnetic detection results, including digital detection atlases of four typical dikes: hollow, uncompacted, seeping and normal, and during data processing, the server invokes the typical atlas library and studies and judges the hidden danger obtained from detection by the method of intelligent image identification;

The data processing includes:

(i) for the data acquired by the detection system, adopting the detection results within 5 m below the detection surface detected by the ground penetrating radar detection module in real time and abandoning the data signals above 5 m; adopting the detection results 5 m~30 m below the detection surface detected by the transient electromagnetic module in real time; and adopting the overall elastic wave velocity information of dike sections detected by the seismic wave detection module by sections, and determining weak dike sections based on dike section wave velocity $Vs<140$ m/s;

(ii) constructing a twin 3 D model of the dike through the point cloud data and real images sent back by the scanning system and the video recording system;

(iii) determining the positions of the areas with hidden danger inside the dike found during general inspection in combination with the position information returned by the positioning system, and visually displaying the areas with hidden danger in combination with the twin 3 D model; and displaying in real time the position of the operation vehicle in combination with an electronic map;

(iv) visually displaying the processing results of the server by the display device;

a communication system, used for communication of systems/devices inside the vehicle and/or for remote communication with external devices;

a control system, connected to the detection system and the scanning system and used for operation control;

a power distribution module, mounted on the operation vehicle and supplying power to electric devices.

The deeper the detection of the ground penetrating radar, the poorer its resolution and the lower the effective accuracy of identification of abnormal hidden danger. Limiting the detection depth to within 5 m can ensure the accuracy of the detection module. Transient electromagnetism has a detection blind area in the shallow layer due to current turn-off time. The detection blind area is relevant to the overall detection depth. Adopting a transient electromagnetic range of 5~30 m can avoid the blind area, meets the requirements for dike depth detection and enables a detection till the dike foundation. The ground penetrating radar and transient electromagnetism lay particular stress on the detection of a single hidden danger, for example: loophole and cavity, and are unable to sufficiently display the overall situation of the dike, for example, the whole dike section is soaked in water in a saturated state, or the whole dike section is not dense. When seismic wave is adopted, the wave velocity can reflect the overall condition of the dike section, thereby knowing the condition of the whole section of dike. Further, the dike is divided into 50 m long sections and the minimum wave velocity measured within 50 m is used as a judgment basis.

Based on the foregoing system, the adoption of the ground penetrating radar detection module, the transient electromagnetic detection module and the seismic wave detection module can realize full-depth detection of hidden danger of the dike, and eliminate risks in a timely manner through hidden danger positions and site marking; study and judge the overall condition of the dike section, and screen out weak dike sections for manual review and emphasized inspection.

In an embodiment, the operation vehicle is an off-road type vehicle. The off-road type vehicle features a large fording depth, a large carrying capacity and a long endurance mileage and is able to move on a muddy road in a flood season. Its gross weight is ≤5 tons.

In an embodiment, the ground penetrating radar detection module comprises a radar antenna, a signal processor and a towing device; the ground penetrating radar antenna is connected to the signal processor via a communication cable, one end of the towing device is fixed inside the operation shelter and the other end is mounted with the ground penetrating radar antenna, and the towing device is retractable and accesses a control system, which controls operation or takes back the operation shelter;

The transient electromagnetic detection module comprises an electromagnetic coil, a signal repeater and a support device; the electromagnetic coil is connected to the signal repeater via a communication cable; the signal repeater is mounted in the cabinet of the operation shelter and connected to a data processing system via a communication cable; one end of the support device is fixed in front of the cockpit and the other end is mounted with the electromagnetic coil; the support device has the function of stretching or lodging and accesses a control system, which controls operation or recovery;

The seismic wave detection module comprises a strip type sensor, a signal collector, a winch and an excitation device; the strip type sensor is connected to the signal collector via a communication cable; the signal collector is mounted inside the cabinet of the operation shelter and connected to a data processing system via a communication cable; one end of the winch is fixed to the inside of the operation shelter and the other end is connected to the strip type sensor; the excitation device is used to impact the dike surface to excite elastic waves; the winch accesses the control system, which controls operation or recovery, and during operation, the strip type sensor is towed to behind or a side of the operation vehicle. In an embodiment, the towing length L of the strip type sensor is ≥10 m, the interval of the detectors is ≤1 m, and the overlapping length between the cover length of the strip type sensor during each excitation and the cover length in the previous detection is ≥1/2 L; when the vehicle speed is stable, excitation is controlled by interval. When the vehicle speed is 5 km/h and the towing length is 20 m, the excitation time shall be ≤7.2 s.

In an embodiment, the towing device is made of a nonmetallic material, which is carbon fiber or polymethyl methacrylate;

The support device is made of a resilient material, which can be carbon fiber or nylon;

The structure and material of the support device enable it to send the electromagnetic coil to the front of the vehicle by more than 1m during stretching/flipping, and to take the electromagnetic coil back to the top of the engine hood during retraction.

As the ground penetrating radar and the transient electromagnetism perform detection both based on the electromagnetic method, are sensitive to ferro magnetic materials and interfere in each other, in this system the ground penetrating radar is mounted in the rear; and the transient electromagnetism is mounted in the front, its stretching distance is limited, and meanwhile, the use of nonmetallic materials for the towing device and the support/lodging device can effectively solve the problem of interference.

In an embodiment, the positioning system further comprises a vehicle encoder mounted on a wheel of the operation vehicle;

The vehicle encoder transmits operation vehicle motion signals to the detection system and the scanning system and triggers automatic operation of the detection system and the scanning system to collect signals.

In an embodiment, the positioning system further comprises a deviation correction module;

When the detection components of the detection system and the scanning system are at the positions for an operating state, the relative position between each detection component and the positioning module is obtained and input to the deviation correction module;

The deviation correction module corrects the positions of the detection components according to the positioning information sent by the positioning module during operation, and based on the pre-saved relative position relationship, obtains corrected detection positions and send them to the data processing system.

In an embodiment, the data processing system further comprises a display device, which is connected to a server to visually display data processing results.

In an embodiment, the video recording system comprises a front camera module arranged in the front of the operation vehicle and a rear camera module arranged in the rear of the operation vehicle;

The front camera module and the rear camera module are both vehicle-mounted PTZ cameras with a night vision function.

In an embodiment, the display device comprises a first screen and a second screen, which are both 2×2 4-split screen display devices, In the first screen, the first split screen displays the detection results of the ground penetrating radar detection module; the second split screen displays the detection results of the transient electromagnetic detection module; the third split screen displays an electronic map containing operation vehicle position information; the fourth split screen displays a digital twin dike three-dimensional model and displays and inlays detected hidden danger in form of areas in different colors; and the dike sections with different wave velocity are displayed in different brightness;

In the second screen, the first split screen and the second split screen present atlases that cannot be interpreted by the server according to the typical atlas library, for the study and judgment of technicians; the third split screen displays real images sent back by the video recording system; and the fourth split screen is reserved for the function of remote video communication.

In an embodiment, a marking device is also comprised, which is mounted below the tail of the operation shelter and used for marking dike sections with hidden danger/danger;

The marking device accesses a control system, which controls on-off according to the processing results of the data processing system;

The marking device is an electric duster; the marking powder inside the electric duster is white or red fluorescent powder.

In an embodiment, a sound/light alarm device is also comprised; the sound/light alarm device is warning lights and/or warning horns mounted on the operation vehicle; and the sound/light alarm device accesses the control system. The warning lights flash during operation and the warning horns can whistle as an alarm. During operation under harsh conditions like heavy rainfall and night, the device plays a role of eye-catching and warning.

In an embodiment, the communication system comprises a mobile network, a microwave radio and a satellite communication antenna. The mobile network is used in an area with mobile signals and can transmit data to a cloud network; the microwave radio can transmit information in real time to a nearby command center; and the satellite communication antenna is used in a section without signals, for remote emergency communication.

In an embodiment, the positioning module is a Beidou positioning module.

Another aspect of embodiments of the present invention is to provide an operation method of the foregoing vehicle-mounted equipment for rapid detection of danger and hidden danger of a dike, comprising the following steps:

S1: driving an operation vehicle to dike sections to be inspected, controlling a detection system and a scanning system by a control system to prepare for operation, and shifting the equipment from a maneuvering state to an operation state, i.e.,:

controlling a towing device to release a radar antenna and causing the radar antenna to fit to the dike surface; controlling a support device to put out an electromagnetic coil; controlling a winch to put out a strip type sensor; and controlling a lifting module to lift a laser radar module;

S2: obtaining the position of the operation vehicle from a positioning system; transmitting the position information to a remote control center via a communication system; measuring the actual deviation distance of each detection module in the detection system from the scanning system and the positioning system, and inputting deviated azimuth information into the deviation correction module;

S3: The technicians are in place in the operation shelter and check and confirm that all modules and instruments work normally;

S4: The driver drives the operation vehicle along the dike survey line; and the data obtained by the detection system, the scanning system and the video recording system is transmitted to a data processing system in real time;

S5: automatically analyzing detection data, scanning data and real images through the data processing system, and marking and sending the position information obtained from the positioning system when identifying internal hidden danger or danger; meanwhile, controlling the marking device through the control system to perform marking on the spot; and displaying information that cannot be identified by invoking a typical atlas library on the second screen, and studying and judging it by technician;

S6: transmitting detection information and real images to a rear command center through a communication system in real time, so that experts and rescue team know the situation of the dike and timely eliminate the risks of the dike sections with hidden danger;

S7: outputting the position information of the area with hidden danger and corresponding real images, and quickly determining the area with hidden danger based on site marking, thereby quickly dealing with the emergency; and S8: controlling the detection system and the scanning system to end the operation through the control system, i.e., taking back all detection devices and shifting the equipment from an operation state to a maneuvering state.

The hardware of the equipment integrates all modules, and mutual disassembly is not needed. By shifting between maneuvering state and operation state, the detection equipment realizes remote maneuvering and rapid operation.

BRIEF DESCRIPTION

Some of the embodiments will be described in detail, with reference to the following figures, wherein like designations denote like members, wherein.

In the figures.

1.1 is an operation vehicle, 1.2 is an operation shelter, and 1.3 is a power distribution module.

2.1 is a ground penetrating radar detection module, 2.2 is a transient electromagnetic detection module, 2.3 is a seismic wave detection module, 2.1.1 is a radar antenna, 2.1.2 is a signal processor, 2.1.3 is a towing device, 2.2.1 is an electromagnetic coil, 2.2.2 is a signal repeater, 2.2.3 is a support device; 2.3.1 is a strip type sensor, 2.3.2 is a signal collector, 2.3.3 is a winch, and 2.3.4 is an excitation device.

3 is a scanning system, 3.1 is a laser radar module, and 3.2 is a lifting module.

4.1 is a front camera module, and 4.2 is a rear camera module.

5.1 is a Beidou positioning module, 5.2 is a vehicle encoder, and 5.3 is a deviation correction module.

6.1 is a server, and 6.2 is a display device.

7.1 is a mobile network, 7.2 is a microwave radio, and 7.3 is a satellite communication antenna.

8.1 is marking powder and 8.2 is an electric duster.

9 is a control system.

10.1 is a warning light, and 10.2 is a warning horn.

11 is a dike section.

12 is a hidden danger of seepage inside the dike.

DETAILED DESCRIPTION

Embodiment 1

This embodiment describes the structure of vehicle-mounted equipment for detection of danger and hidden danger of a dike.

As shown in FIG. 1 to FIG. 4, the structure of the vehicle-mounted equipment for detection of danger and hidden danger of a dike comprises:

(1) an operation vehicle 1.1, which is an off-road vehicle of Dongfeng brand, with a maximum fording depth of 75 cm, an endurance mileage of 600 km and a load capacity of 8 t and meeting technical requirements; an operation shelter 1.2, which is made of lightweight high-strength alloy and of which dimensions are 3 m×2m×1.6 m (L×W×H); and a power distribution module 1.3, which is a stand-alone power generator provided with a power distribution controller to separately supply 220V AC power to the whole vehicle.

(2) a detection system. In the ground penetrating radar detection module 2.1, the radar antenna 2.1.1 is a GC100M radar antenna; the signal processor 2.1.2 is an LTD-2600 signal processor; the towing device 2.1.3 is made of polyethylene sheets and attached with a retractable cable. The radar antenna 2.1.1 is connected to the signal processor; the towing device 2.1.3 is connected to the control system 9; the signal processor 2.1.2 is mounted in the cabinet of the operation shelter 1.2 and accesses the data processing system 6; and the signal processor 2.1.2 is connected to the power distribution module 1.3.

In the transient electromagnetic module 2.2, the electromagnetic coil 2.2.1 is a large-current multi-turn loop coil with a diameter of 70 cm; the signal repeater 2.2.2 is an FCTEM60 pull-type high-resolution transient electromagnetic system; and the support device 2.2.3 is a lodging mechanism made of carbon fiber. The electromagnetic coil 2.2.1 is connected to the signal repeater 2.2.2; the support device 2.2.3 is mounted on the support device in front of the vehicle and connected to the control system 9; the signal repeater 2.2.2 accesses the data processing system 6; and the signal repeater 2.2.2 is connected to the power distribution module 1.3.

In the seismic wave detection module 2.3, the winch 2.3.3 is a windlass with a diameter of 40 cm; the strip type sensor 2.3.1 consists of 20 sets of gravity-coupled detectors, with an interval of 0.5 m; the signal collector 2.3.2 is a towed array seismic detection system; and the excitation device 2.3.4 is an electromagnetic hammer with a single impact force of 1.5 kN. The winch 2.3.3 is connected to the strip type sensor and is retractable; and the excitation device 2.3.4 is mounted below the operation shelter 1.2 and accesses the control system 9; the signal collector 2.3.2 accesses the data processing system 6; and the signal collector 2.3.2 is connected to the power distribution module 1.3.

(3) a scanning system 3. The laser radar 3.1 is a Hiscan-C lightweight 3 D laser mobile measurement system; and the lifting module 3.2 is a shear-fork type lifting platform. The laser radar 3.1 accesses a data processing system 6, and the laser radar 3.1 is connected to the power distribution module 1.3; and the lifting module 3.2 is mounted on the tail of the operation shelter, and its maximum lifting height exceeds the top of the operation shelter 1.2 by 2 m.

(4) a video recording system. The front camera module 4.1 and the rear camera module 4.2 are both vehicle mounted PTZ cameras with a night vision function, and mounted in the front of the operation vehicle 1.1 and in the rear of the operation shelter 1.2, respectively.

(5) a positioning system. The Beidou positioning module 5.1 is mounted on the top of the operation shelter 1.2; and the vehicle encoder 5.2 is mounted on a wheel of the operation vehicle 1.1. The positioning system 5 is connected to the data processing system 6 and connects the power distribution module 1.3; and the deviation correction module 5.3 is connected to the data processing system 6.

(6) a data processing system. The high-performance vehicle-mounted server 6.1 is a Dongtian DTB-3312 signal IPC (industrial personal computer); and the vehicle-mounted screens 6.2 are two 43-inch 4K HD screens (corresponding to the first screen and the second screen). The high-performance vehicle-mounted server 6.1 and the vehicle-mounted screens 6.2 are all mounted inside the vehicle-mounted shelter 1.2.

The server 6.1 contains a typical atlas library of ground penetrating radar and transient electromagnetic detection results, including digital detection atlases of four typical dikes: hollow, uncompacted, seeping and normal, and during data processing, the server 6.1 invokes the typical atlas library and studies and judges the hidden danger obtained from detection by the method of intelligent image identification;

The data processing includes:

(i) for the data acquired by the detection system, adopting the detection results within 5 m below the detection surface detected by the ground penetrating radar detection module 2.1 in real time and abandoning the data signals above 5 m; adopting the detection results 5 m~30m below the detection surface detected by the transient electromagnetic module 2.2 in real time; and adopting the overall hierarchical information of the dike detected by the seismic wave detection module 2.3 by sections, and determining weak dike sections based on the layer uniformity of the dike;

(ii) constructing a twin 3 D model of the dike through the point cloud data and real images sent back by the scanning system and the video recording system;

(iii) determining the positions of the areas with hidden danger inside the dike found during general inspection in combination with the position information returned by the positioning system, and visually displaying the areas with hidden danger in combination with the twin 3D model; and displaying in real time the position of the operation vehicle 1.1 in combination with an electronic map; and (iv) visually displaying the processing results of the server 6.1.

The display device 6.2 comprises a first screen and a second screen, which are both 2×2 4-split screen display devices. In the first screen, the first split screen displays the detection results of the ground penetrating radar detection module 2.1; the second split screen displays the detection results of the transient electromagnetic detection module 2.2; the third split screen displays an electronic map containing the operation vehicle 1.1; the fourth split screen displays a digital twin dike three-dimensional model and displays and inlays detected hidden danger in form of areas in different colors; and the dike sections with different wave velocity are displayed in different brightness. In the second screen, the first split screen and the second split screen present atlases that cannot be interpreted by the server 6.1 according to the typical atlas library, for the study and judgment of technicians; the third split screen displays real images sent back by the video recording system; and the fourth split screen is reserved for the function of remote video communication.

(7) a communication system.

A mobile network 7.1, a microwave radio 7.2 and a satellite communication antenna 7.3 are mounted in the operation shelter 1.2 and access the data processing system 6.

(8) a marking device.

The marking powder 8.1 is white and red fluorescent powder, and the sprinkler 8.2 is an electric duster. This system is mounted below the tail of the operation shelter 1.2.

(9) a control system 9.

The control system 9 is mounted inside the operation shelter 1.2 and can control the towing device 2.1.3 in the ground penetrating radar module 2.1, the support device 2.2.3 in the transient electromagnetic module 2.2, and the winch 2.3.3 and the excitation device 2.3.4 in the seismic wave module 2.3; control the lifting module 3.2 in the scanning system 3; control the sprinkler 8.2 in the marking system 8; and control the on-off of the warning lights 10.1 and the warning horns 10.2 in the auxiliary system 10.

(10) sound and light warning device.

The warning lights are LED strobe warning lights mounted on the sides and in the rear of the operation shelter, in 3 groups and total of 6; and the warning horns are MS-290 conch alarms, mounted on the two sides of the operation shelter, in total of 2.

Embodiment 2

This embodiment describes the site operation method of the mounted vehicle-mounted equipment for rapid detection of danger and hidden danger of a dike during emergency inspection in a flood season.

Figure 3:
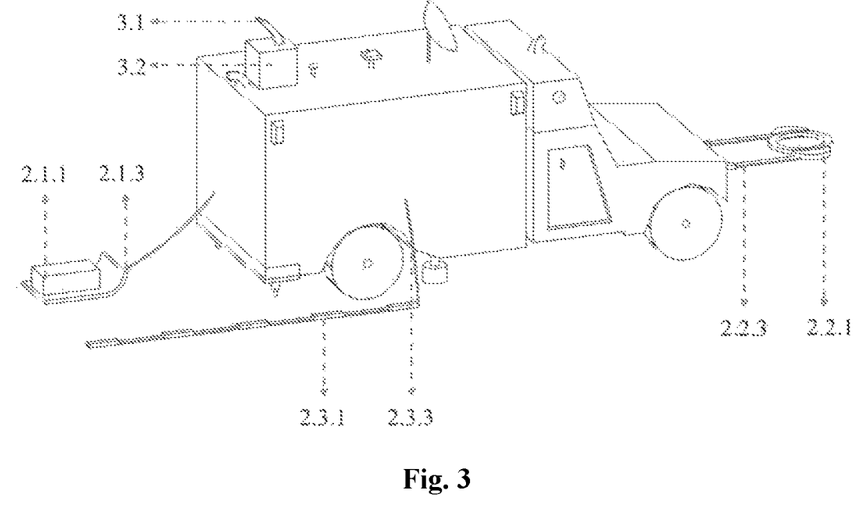
FIG. 3 is an outside view of vehicle-mounted equipment for rapid detection of danger and hidden danger of a dike in an operation state.

S1: Put the equipment in place. Drive the mounted vehicle-mounted equipment for rapid detection of danger and hidden danger of a dike to a dike section 11 to be inspected, which is dike top this time. Control a detection system and a scanning system 3 through a control system 9 to be in place and shift the equipment from a maneuvering state (FIG. 1) to an operation state (FIG. 3). Control a towing device 2.1.3 to release a radar antenna 2.1.1 and cause the radar antenna 2.1.1 to fit to the dike surface; control a support device 2.2.3 to put out an electromagnetic coil 2.2.1; and control a winch 2.3.3 to put out a strip type sensor 2.3.1. Control a lifting module 3.2 to lift a laser radar module 3.1.

S2: Position the equipment. Obtain the position of the equipment from a positioning system and display in real time the position on a vehicle-mounted screen 6.2 inside the operation shelter 1.2 with the help of an electronic map; transmit the position information to a remote control center via a communication system; measure the actual deviation distance of each detection module in the detection system from the scanning system 3 and the positioning system, and input deviated azimuth information into the deviation correction module 5.3.

S3: Allocate personnel in place. Two technicians are in the operation seats inside the operation shelter 1.2 and check and confirm that all modules and instruments work normally.

Figure 4:
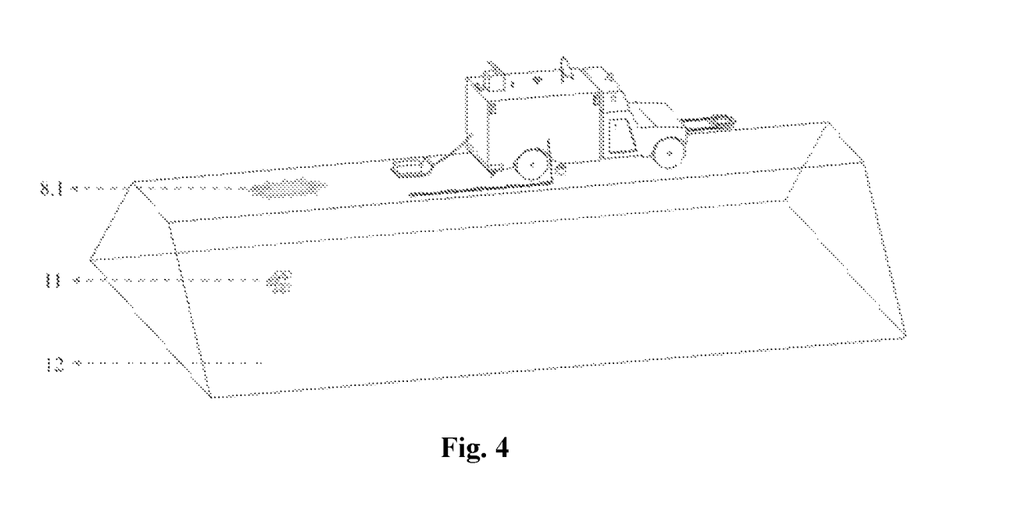
FIG. 4 is a schematic view of vehicle-mounted equipment for rapid detection of danger and hidden danger of a dike during operation.

S4: Start the operation. The driver drives the equipment along the dike survey line. The data obtained by the detection system, the scanning system 3 and the video recording system is transmitted to a data processing system in real time. This vehicle-mounted equipment runs at a speed of 10 km/h, and the warning lights 10.1 flash during the run.

S5: Mark exceptions. Automatically analyze detection data, scanning data and real images through the data processing system, display information that cannot be identified by invoking a typical atlas library on the second screen, and study and judge it by technician. Mark and send the position information obtained from the positioning system when a hidden danger 12 of seepage is found at a location of the dike section; and meanwhile, control the electric duster 8.2 by the control system 9 to spray white fluorescent powder for on-site marking.

S6: Store data. Transmit detection information and real images to a rear command center through a communication system in real time when the network signals in the environment are good, so that experts and rescue team know the situation of the dike and timely eliminate the risks of the dike sections with hidden danger.

S7: Display results. Output the position information of the area with hidden danger and corresponding real images, and quickly determine the area with hidden danger based on site marking with fluorescent powder 8.1, thereby quickly dealing with the emergency.

Figure 1:
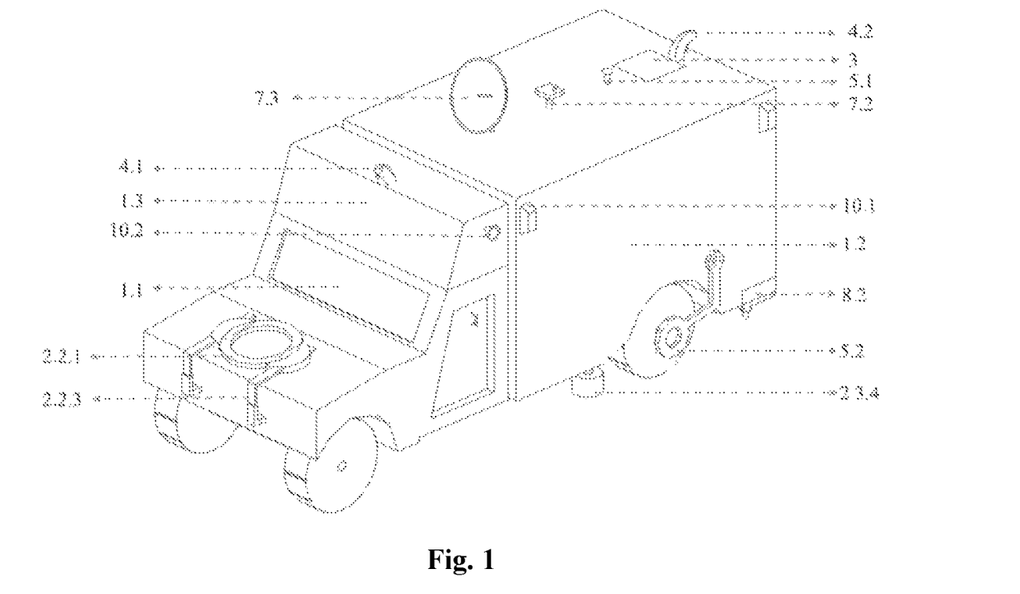
FIG. 1 is an outside view of vehicle-mounted equipment for rapid detection of danger and hidden danger of a dike in a maneuvering state.
Figure 2:
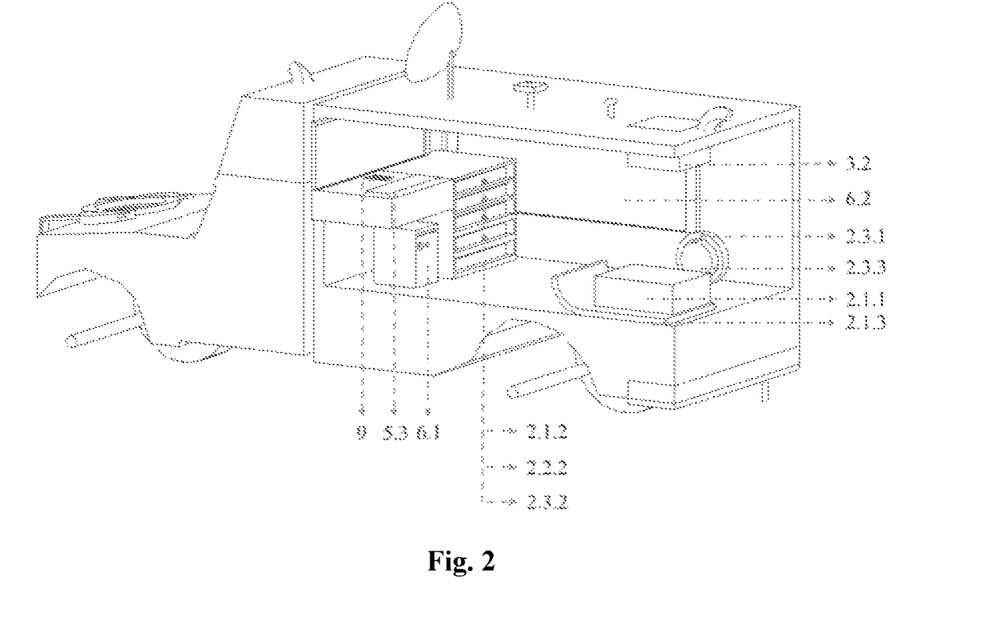
FIG. 2 is a section view of vehicle-mounted equipment for rapid detection of danger and hidden danger of a dike in a maneuvering state.

S8: Put the equipment back to the shelter. Control the detection system and the scanning system 3 through the control system to go back into the operation shelter 1.2. Shift the equipment from an operation state (FIG. 3) to a maneuvering state (FIG. 2).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

We claim:

1. A vehicle-mounted equipment for rapid detection of danger and hidden danger of a dike, wherein the equipment comprises:
    an operation vehicle;
    an operation shelter, located behind the cockpit of the operation vehicle and arranged on the chassis of the operation vehicle;
    a detection system, including a ground penetrating radar detection module, a transient electromagnetic detection module and a seismic wave detection module to perform physical detection of the dike, respectively; wherein the ground penetrating radar detection module is mounted behind the operation vehicle by a towing device; and the transient electromagnetic detection module being mounted in front of the operation vehicle by a support device;
    a marking device, mounted below the tail of the operation shelter and used for marking dike sections with hidden danger/danger;
    a scanning system, comprising a laser radar module and a lifting module, wherein the lifting module is mounted at the tail end of the top of the operation shelter, and the laser radar module being fixed on the lifting module, moving with the operation vehicle and scanning the dike surface;
    a video recording system, for video-recording the environment around the operation vehicle;
    a positioning system, including a positioning module mounted on the top of the operation shelter, wherein the positioning module transmits positioning information synchronously to the detection system, the scanning system, the video recording system and a data processing system; and the positioning system further comprising a deviation correction module to position and correct detection components;

the data processing system, including a server mounted inside the operation shelter and a display device connected to the server, wherein the server receives and processes data transmitted by the detection system, the scanning system and the positioning system; the server containing a typical atlas library of ground penetrating radar and transient electromagnetic detection results, including digital detection atlases of four typical dikes: hollow, uncompacted, seeping and normal, and during data processing, the server invoking the typical atlas library and studying and judging the hidden danger obtained from detection by the method of intelligent image identification;

the data processing including:

(i) for the data acquired by the detection system, adopting the detection results within 5 m below the detection surface detected by the ground penetrating radar detection module in real time and abandoning the data signals above 5 m; adopting the detection results 5m~30 m below the detection surface detected by the transient electromagnetic module in real time;

and adopting the elastic wave velocity information of dike sections detected by the seismic wave detection module by sections, and determining weak dike sections based on dike section wave velocity Vs<140 m/s;

(ii) constructing a twin 3 D model of the dike through the point cloud data and real images sent back by the scanning system and the video recording system;

(iii) determining the positions of the areas with hidden danger inside the dike found during general inspection in combination with the position information returned by the positioning system, and visually displaying the areas with hidden danger in combination with the twin 3 D model; and displaying in real time the position of the operation vehicle in combination with an electronic map;

(iv) visually displaying the processing results of the server by the display device;

a communication system, used for communication of systems/devices inside the vehicle and/or for remote communication with external devices;

a control system, connected to the detection system and the scanning system and used for operation control; and a power distribution module, mounted on the operation vehicle and supplying power to electric devices.

2. The vehicle-mounted equipment for rapid detection of danger and hidden danger of a dike according to claim 1, wherein the ground penetrating radar detection module comprises a radar antenna, a signal processor and a towing device; the ground penetrating radar antenna is connected to the signal processor via a communication cable, one end of the towing device is fixed inside the operation shelter and the other end is mounted with the ground penetrating radar antenna, and the towing device is retractable and accesses a control system, which controls operation or takes back the operation shelter;

the transient electromagnetic detection module including an electromagnetic coil, a signal repeater and a support device; the electromagnetic coil being connected to the signal repeater via a communication cable; the signal repeater being mounted in the cabinet of the operation shelter and connected to a data processing system via a communication cable; one end of the support device being fixed in front of the cockpit and the other end being mounted with the electromagnetic coil; the support device having the function of stretching or lodging, and accessing a control system, which controls operation or recovery;

the seismic wave detection module including a strip type sensor, a signal collector, a winch and an excitation device; the strip type sensor being connected to the signal collector via a communication cable; the signal collector being mounted inside the cabinet of the operation shelter) and connected to a data processing system via a communication cable; one end of the winch being fixed to the inside of the operation shelter and the other end being connected to the strip type sensor; the excitation device being used to impact the dike surface to excite elastic waves; the winch) accessing the control system, which controls operation or recovery, and during operation, the strip type sensor being towed to behind or a side of the operation vehicle; the towing length L of the strip type sensor being ≥10 m, the interval of the detectors being ≤1 m, and the overlapping length between the cover length of the strip type sensor during each excitation and the cover length in the previous detection being ≥L/2; and when the vehicle speed is stable, excitation being controlled by interval.

3. The vehicle-mounted equipment for rapid detection of danger and hidden danger of a dike according to claim 2, wherein the towing device is made of a nonmetallic material, which is carbon fiber or polymethyl methacrylate;

the structure of the support device enabling it to send the electromagnetic coil to the front of the vehicle by more than 1m during stretching/flipping, and to take the electromagnetic coil back to the top of the engine hood during retraction.

4. The vehicle-mounted equipment for rapid detection of danger and hidden danger of a dike according to claim 1, wherein the positioning system further comprising a vehicle encoder mounted on a wheel of the operation vehicle;

the vehicle encoder transmitting operation vehicle motion signals to the detection system and the scanning system and triggering automatic operation of the detection system and the scanning system to collect signals.

5. The vehicle-mounted equipment for rapid detection of danger and hidden danger of a dike according to claim 1, wherein when the detection components of the detection system and the scanning system are at the positions for an operating state, the relative position between each detection component and the positioning module is obtained and input to the deviation correction module; and the deviation correction module correcting the positions of the detection components according to the positioning information sent by the positioning module during operation, and based on the pre-saved relative position relationship, obtaining corrected detection positions and sending them to the data processing system.

6. The vehicle-mounted equipment for rapid detection of danger and hidden danger of a dike according to claim 1, wherein the video recording system comprises a front camera module arranged in the front of the operation vehicle and a rear camera module arranged in the rear of the operation vehicle;

the front camera module and the rear camera module being both vehicle mounted PTZ cameras with a night vision function.

7. The vehicle-mounted equipment for rapid detection of danger and hidden danger of a dike according to claim 1, wherein the display device comprises a first screen and a second screen, which are both 2×2 4-split screen display devices, in the first screen, the first split screen displaying the detection results of the ground penetrating radar detection module; the second split screen displaying the detection results of the transient electromagnetic detection module; the third split screen displays an electronic map containing operation vehicle position information; the fourth split screen displaying a digital twin dike three-dimensional model and displaying and inlaying detected hidden danger in form of areas in different colors; and the dike sections with different wave velocity being displayed in different brightness; and     in the second screen, the first split screen and the second split screen presenting atlases that cannot be interpreted by the server according to the typical atlas library, for the study and judgment of technicians; and the third split screen displaying real images sent back by the video recording system; and the fourth split screen being reserved for the function of remote video communication.

8. The vehicle-mounted equipment for rapid detection of danger and hidden danger of a dike according to claim 1, wherein the marking device accesses a control system, which controls on-off according to the processing results of the data processing system; and     the marking device being an electric duster; and the marking powder) inside the electric duster being white or red fluorescent powder.

9. The vehicle-mounted equipment for rapid detection of danger and hidden danger of a dike according to claim 1, wherein a sound/light alarm device is also comprised; the sound/light alarm device being warning lights and/or warning horns mounted on the operation vehicle;

and the sound/light alarm device accessing the control system.

10. An operation method of the vehicle-mounted equipment for rapid detection of danger and hidden danger of a dike according to claim 1, wherein the method further comprising the following:

S1: driving an operation vehicle to dike sections to be inspected, controlling a detection system and a scanning system by a control system to prepare for operation, and shifting the equipment from a maneuvering state to an operation state,     controlling a towing device (2.1.3) to release a radar antenna (2.1.1) and causing the radar antenna (2.1.1) to fit to the dike surface; controlling a support device (2.2.3) to put out an electromagnetic coil (2.2.1); controlling a winch (2.3.3) to put out a strip type sensor (2.3.1);

and controlling a lifting module (3.2) to lift a laser radar module (3.1);

S2: obtaining the position of the operation vehicle from a positioning system; transmitting the position information to a remote control center via a communication system; measuring the actual deviation distance of each detection module in the detection system from the scanning system and the positioning system, and inputting deviated azimuth information into the deviation correction module;

S3: the technicians being in place in the operation shelter and checking and confirming that all modules and instruments work normally;

S4: the driver driving the operation vehicle along the dike survey line; and the detection system, the scanning system and the video recording system transmitting the obtained data to a data processing system in real time;

S5: automatically analyzing detection data, scanning data and real images through the data processing system, and marking and sending the position information obtained from the positioning system when identifying internal hidden danger or danger; meanwhile, controlling the marking device through the control system to perform marking on the spot;

and displaying information that cannot be identified by invoking a typical atlas library on the second screen, and studying and judging it by technician;

S6: transmitting detection information and real images to a rear command center through a communication system in real time, so that experts and rescue team know the situation of the dike and timely eliminate the risks of the dike sections with hidden danger;

S7: outputting the position information of the area with hidden danger and corresponding real images, and quickly determining the area with hidden danger based on site marking, thereby quickly dealing with the emergency; and     S8: controlling the detection system and the scanning system to end the operation through the control system, taking back all detection devices and shifting the equipment from an operation state to a maneuvering state.

\* \* \* \* \*